United States Patent
Chen et al.

(10) Patent No.: US 10,394,200 B2
(45) Date of Patent: Aug. 27, 2019

(54) CONTROLLING METHOD AND SYSTEM FOR SMART HOME

(71) Applicant: SHENZHEN SKYWORTH-RGB ELECTRONIC CO., LTD, Shenzhen (CN)

(72) Inventors: Song Chen, Shenzhen (CN); Fulin Ni, Shenzhen (CN); Dongyan Zhang, Shenzhen (CN); Yun Ma, Shenzhen (CN)

(73) Assignee: SHENZHEN SKYWORTH-RGB ELECTRONIC CO., LTD, Shenzhen (CN)

( * ) Notice: Subject to any disclaimer, the term of this patent is extended or adjusted under 35 U.S.C. 154(b) by 407 days.

(21) Appl. No.: 14/916,479

(22) PCT Filed: Dec. 3, 2014

(86) PCT No.: PCT/CN2014/092968
§ 371 (c)(1),
(2) Date: Mar. 3, 2016

(87) PCT Pub. No.: WO2016/029585
PCT Pub. Date: Mar. 3, 2016

(65) Prior Publication Data
US 2016/0195861 A1 Jul. 7, 2016

(30) Foreign Application Priority Data
Aug. 27, 2014 (CN) .......................... 2014 1 0426529

(51) Int. Cl.
*G05B 15/02* (2006.01)
*G05B 19/418* (2006.01)
*H04L 12/28* (2006.01)

(52) U.S. Cl.
CPC .......... *G05B 15/02* (2013.01); *G05B 19/418* (2013.01); *H04L 12/28* (2013.01);
(Continued)

(58) Field of Classification Search
None
See application file for complete search history.

(56) References Cited

U.S. PATENT DOCUMENTS 6,400,956 B1 6/2002 Richton
6,785,592 B1* 8/2004 Smith .................... G06Q 50/06
700/291
(Continued)

FOREIGN PATENT DOCUMENTS

CN 101408754 A 4/2009
CN 101718988 A 6/2010
(Continued)

OTHER PUBLICATIONS

Erol-Kantarci, Melike, "Wireless Sensor Networks for Cost-Efficient Residential Energy Management in the Smart Grid", 2011 IEEE.*
(Continued)

*Primary Examiner* — Carlos R Ortiz Rodriguez
(74) *Attorney, Agent, or Firm* — Anova Law Group, PLLC

(57) ABSTRACT

The present invention discloses a controlling method and the system for smart home, each home appliance records a user's plurality of times of operations, and each sensor module in home appliance collects information on multiple times of working modes of each appliance, sends to the router wirelessly; the router analyzes busiest working periods and according working modes of each appliance, based on multiple times' working modes of each appliance and according working periods; router transmits control signals wirelessly to radio module installed in each appliance, to control each corresponding appliance run automatically in the working mode corresponding to the busiest working periods; the said controlling method and system operates simply, controls automatically without any manual operations, close to users' usage habits, and more humanized, it has freed a user's hands, avoided relying too much on mobile terminals, brought a great convenience to users.

15 Claims, 4 Drawing Sheets

(52) U.S. Cl.
CPC ............ *H04L 12/2816* (2013.01); *G05B 2219/23077* (2013.01); *G05B 2219/2613* (2013.01); *G05B 2219/2642* (2013.01)

(56) References Cited

U.S. PATENT DOCUMENTS

| | | | |
|---|---|---|---|
| 2008/0125911 A1* | 5/2008 | Ebrom | G06F 9/54 |
| | | | 700/275 |
| 2011/0238222 A1* | 9/2011 | Nikovski | F24F 11/62 |
| | | | 700/276 |
| 2011/0288378 A1 | 11/2011 | Codd et al. | |
| 2014/0018638 A1 | 1/2014 | Chatterjee | |
| 2014/0118120 A1 | 5/2014 | Chen et al. | |

FOREIGN PATENT DOCUMENTS

| | | |
|---|---|---|
| CN | 102945029 A | 2/2013 |
| CN | 103605717 A | 2/2014 |
| CN | 104166396 A | 11/2014 |

OTHER PUBLICATIONS

The World Intellectual Property Organization (WIPO) International Search Report for PCT/CN2014/092968 dated Jun. 2, 2015.
Zhu, Xinhua et al., "System Modeling of a Smart-Home Healthy Lifestyle Assistant", University of Technology, Sydney, Austrlia, College of Information Science and Engineering, Northeastern University, China, pp. 65-78.

\* cited by examiner

CONTROLLING METHOD AND SYSTEM FOR SMART HOME

CROSS-REFERENCES TO RELATED APPLICATIONS

This application is a national stage patent application of PCT application No. PCT/CN2014/092968, filed on Dec. 3, 2014. This application claims priority to Chinese Patent Application No. 201410426529.X, filed on Aug. 27, 2014, the entire content of which is incorporated herein by reference.

FIELD OF THE INVENTION

The present invention relates to the field of smart home technology, and more particularly, to a controlling method for smart home and the system thereof.

BACKGROUND

Following the continuous progress of smart home technologies, as an application of the internet of things technology, maintaining and controlling more and more smart home devices is also becoming heavier and heavier. It becomes impossible to satisfy a user's requirements with the current method of accomplishing the control and management to smart home devices by using a plurality of remote control devices. In addition, it costs the user a certain time and energy to find the available remote control devices, and, he/she may not know the correct feathers and operation instructions corresponding to the specific smart home devices. Therefore, it is inconvenient for a user to make any operations.

Now, in such a heyday of smart phones, smart TVs and tablets, home appliances in the same network are usually controlled by a mobile terminal. For example, plugging and connecting a node for control to the plug of each home appliance, before connecting all nodes for control to a router and downloading an application in a mobile phone, followed by running the application to turn the AC on, the light on, and the water heater on, etc, therefore, a remote intelligent control is achieved.

The existing smart home control system, usually relies on the control from a software client running in a mobile phone, and it is required to run the client installed in the mobile phone once a while for controlling purposes. Thus, the operation is relatively troublesome, and does not fit for a human's natural habit, it is not humanized, and brings the user a lot of inconveniences. Furthermore, the existing smart home control system owns the intelligence only after a user are involved. For example, the existing smart home control system requires a user's hands to operate, and also relies on a mobile phone too much, which can't analyze and apply the operations of a user to devices.

Furthermore, when a user is almost getting home, the existing smart home control system can't turn on those devices with heat inertia (such as an AC, a water heater, and else) in advance, based on the information of the user's locations. That is, the user has to turn on those home appliances including ACs after arriving at home, thus he/she can't enjoy a comfortable circumstance with a suitable temperature generated by the AC. Similarly, the same situations happen to an electric water heater and an electric rice cooker. In other words, the existing smart home control system has not considered running the home appliances in advance, therefore, has brought inconveniences to users. Therefore, the prior art needs to be improved and developed.

The disclosed methods and systems are directed to solve one or more problems set forth above and other problems.

BRIEF SUMMARY OF THE DISCLOSURE

According to above mentioned defects in the prior arts, the purpose of the present invention is providing a controlling method for smart home and the system thereof, in order to solve the problems in the prior art that, operating an existing smart home device is relatively troublesome, and requires manually operations, as well as relying too much on a mobile terminal.

In order to achieve the above said purposes, the following technology protocols are adopted in the present invention.

A controlling method for smart home includes the following steps: each home appliance records a user's multiple times of operations to it, and collects information on multiple times of working modes of each appliance, based on a sensor module arranged in each appliance, then transmits the information to a router in wireless through a radio module arranged in each appliance; the router analyzes a busiest working period and an according working mode of each appliance, based on the multiple times' working modes of each appliance and the according working periods; and the router transmits in wireless a control signal to the radio module installed in each appliance, to control the said each corresponding appliance run automatically in the working mode corresponding to the busiest working period.

The controlling method for smart home, wherein, before each appliance recording a user's multiple times of operations to it, and collecting information on the multiple times of working modes of each appliance, based on a sensor module arranged in each appliance, then transmitting the information to a router in wireless through a radio module arranged in each appliance, further includes pre-storing the information on the working periods and the according working modes of each appliance for a healthy life in the router.

The controlling method for smart home, wherein, the router transmits in wireless a control signal to the radio module installed in each appliance, to control the said various corresponding appliances run automatically in the working mode corresponding to the busiest working period further includes: the router determines if the information on the busiest working periods and the according working modes of the said each appliance matches the pre-stored information for a healthy life on the working periods and the according working modes of the said each appliance; if it matches, then control the said each appliance run automatically in the working mode corresponding to the busiest working period; if it doesn't match, then send a corresponding suggestion to the user's mobile terminal on the information for a healthy life on the working periods and the according working modes of each appliance.

The controlling method for smart home, wherein, before each appliance recording a plurality times of user's operations to it, and collecting multiple times of information on the working modes of each appliance, based on a sensor module arranged on each appliance, then transmitting the information to a router in wireless through a radio module arranged in each appliance further includes: linking the mobile terminal and the router into a network, then the mobile terminal obtaining the current position information of the router, and transmitting both the said position information of the router and the ID of the mobile terminal to the router for saving.

The controlling method for smart home, wherein, the router transmits correspondingly in wireless, a control signal to the radio module installed in each appliance, to control the said each appliance run automatically in the working mode corresponding to the busiest working period further includes: the mobile terminal obtains its current position information on a basis of a preset time period, and sends to the router through internet; the router determines if the distance between the current positions of the mobile terminal and the router is smaller than a threshold or not, if so, then turns on those devices with heat inertia accordingly, among all the home appliances.

The controlling method for smart home, wherein, before the operations of each appliance recording a plurality times of user's operations to it, based on a sensor module arranged on each appliance, and collecting information on the working modes of each appliance in multiple times, then transmitting to a router in wireless through a radio module arranged in each appliance further includes: pre-storing an information in the router, on the working periods and the according working modes of each appliance according to different seasons and different weather conditions.

The controlling method for smart home, wherein, the router transmits in wireless, a control signal to the radio module installed in each appliance, and control accordingly the said each appliance run automatically in the working mode corresponding to the busiest working period further includes: the router obtains the current season and weather conditions through internet, checks the pre-stored information on the working periods and the working modes of each appliance according to different seasons and different weather conditions, finally obtains the information on the working periods and the according working modes of each appliance according to the current season and the current weather condition; the router determines if the information on the busiest working period and the according working mode of the said each appliance matches the said information on the busiest working period and the according working mode of the said each appliance according to the current season and the current weather conditions; if it matches, then control the said each appliance run automatically in the working mode corresponding to the busiest working period; if it doesn't match, then send a suggestion to the user's mobile terminal on the information of the working periods and the corresponding working modes of each appliance according to the current season and the current weather conditions.

A controlling system for smart home includes a sensor module, arranged in each appliance, used to detect the working state of each corresponding appliance; a radio module, arranged in each appliance, used to transmit in wireless the working state information of the according appliance, and receive in wireless the control signal according to the corresponding appliance sent by the router; and a router.

The router includes a router radio module applied to receive a plurality of times of working modes information of the various appliances collected by the sensor modules installed in the various appliances and sent in wireless by the radio module; a data storage module, applied to save the plurality of times of working modes information and the according working periods of the various appliance; a data analysis module, applied to analyze the busiest working periods and the according working modes of various appliances, based on the plurality of times of working modes of each appliance and the according working periods; a control module, applied to transmit in wireless a control signal to the radio modules installed in various appliances, control accordingly the various appliances automatically run in the busiest periods with the corresponding working modes.

The control system for smart home, wherein the router further includes: a cloud server, applied to receive through internet the current position information of the mobile terminal in every preset certain period; the data storage module, applied also to store the current position information of the router and the current ID of the mobile terminal, obtained by the mobile terminal when it connects with the router in a network; the data analysis module, applied also to determine if the distance between the current position of the mobile terminal and the position of the router is less than a threshold, if so, then turn on those devices with heat inertia accordingly, in all the home appliances.

The control system for smart home, wherein, the data storage module, applied further to save the information on the working periods and the working modes of each appliance according to different seasons and different weather conditions;

The router includes: a could server module, applied to obtain the current season and weather conditions through internet, check the pre-stored information on the working periods and the working modes of each appliance according to different seasons and different weather conditions, and finally obtain the information on the working periods and the according working modes of each appliance according to the current season and the current weather condition; a control module, further applied to determine if the information on the busiest working period and the according working mode of the said each appliance matches the said information on the busiest working periods and the according working modes of the said each appliance according to the current season and the current weather conditions; if it matches, then control the said each appliance run automatically in the working mode corresponding to the busiest working period; if it doesn't match, then send an corresponding suggestion to the user's mobile terminal on the information of the working period and the according working mode of each appliance according to the current season and the current weather conditions.

The controlling method and system for smart home provided by the present invention, has solved effectively the problems of operating the existing smart home system troublesome and requiring a user's manual operations which causes a high reliability on the mobile terminals, and has brought inconveniences to users. The problems are solved through the method of the various appliances recording the users' plurality of times of operations to them, collecting their plurality of working modes information accordingly through the sensor modules arranged in various appliances, and transmitting to the router in wireless through the radio modules arranged in various appliances; the said router analyzes the busiest working periods and the according working modes of each appliance, based on the working modes of each appliance in a plurality of times and the according working periods; the said router then transmits the control signal in wireless to the radio modules installed in the said various appliances, controls the said corresponding various appliances run automatically in the working mode corresponding to the busiest working period; the said controlling method and system owns a simple operation, may be controlled automatically without any user's manual operations, it is close to a user's usage habits, and more humanized, it has freed a user's hands, and avoided relying too much on the mobile terminals, therefore, it has brought a great convenience to users.

More detailed descriptions on the specific embodiments of the present invention are described below, together with the accompany drawings.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present invention provides a controlling method for smart home and the system thereof.

Figure 1:
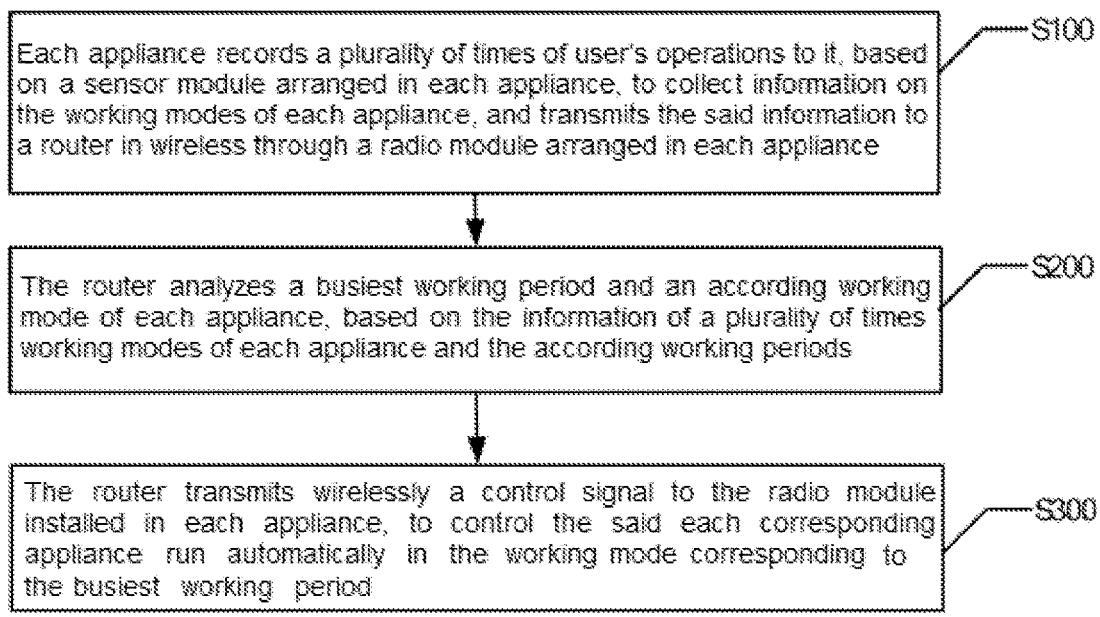
FIG. 1 illustrates a flow chart on a preferred embodiment of the controlling method for smart home as provided in the present invention.

Referencing to FIG. 1, which illustrates a flow chart on a preferred embodiment of the controlling method for smart home as provided in the present invention, shown as FIG. 1, the said controlling method for smart home includes the following steps:

Step S100, each appliance records a plurality of times of user's operations to it, based on a sensor module arranged in each appliance, to collect information on the working modes of each appliance, and transmits the said information to a router in wireless through a radio module arranged in each appliance;

Step S200, the router analyzes a busiest working period and an according working mode of each appliance, based on the information of a plurality of times' working modes of each appliance and the according working periods; and Step S300, the router transmits wirelessly a control signal to the radio module installed in each appliance, to control the said each corresponding appliance run automatically in the working mode corresponding to the busiest working period.

Detailed descriptions of the above mentioned steps are stated here, referencing to the specific embodiments of the present invention.

In the step S100, each appliance records a plurality of user's operations to it, based on a sensor module arranged on each appliance, to collect information on the working modes of each appliance in multiple times, and transmits to a router in wireless through a radio module arranged in each appliance. Specifically, it collects the user's usage habits to each appliance. In other words, each time when a user operates an appliance, those sensor modules installed in the appliance will collect the user-selected working modes information of the appliance, which will then be transmitted to a router for saving, through a radio module. Such a collection is continuous, i.e., the router keeps collecting and saving the working modes information transmitted from various appliances.

In preferred embodiments, the present invention pre-installs a sensor module in each appliance, which may be applied to detect the working state of the corresponding appliance, and a radio module in each appliance, which may be applied to transmit in wireless the working state information from the corresponding appliance and receive in wireless the control signal to the corresponding appliance. Specifically, the said appliances include refrigerators, TVs, washing machines, air conditioners, water heaters, drinking fountains, range hoods, rice cookers, microwaves and electric stoves, etc. The appliances also include network devices, the network devices include printers, stereos and computers, etc.

There are no centralized control devices installed in the existing appliances, thus, a radio module and a sensor module are pre-installed in each appliance according to the present invention. The sensor module is applied to detect the working state of the corresponding appliance, and the radio module is applied to detect the usage states of each appliance in real time. The said sensor modules belong to the prior art; thus no further detailed descriptions are stated here. The radio module is applied to transmit in wireless the working state information from the corresponding appliance and receive in wireless the control signal to the corresponding appliance. In other words, the sensor module may detect the working state information of the controlled appliances, and transmit the information to the router through the radio module. The router may also transmit in wireless the control signal to the corresponding appliances to the various radio module, thus control the corresponding various appliances.

In preferred embodiments, the radio module connects to the appliance for control through a UART port (Universal Asynchronous Receiver/Transmitter), which is a two-way full-duplex interface, the router may transmit the control instructions to the appliance for control through the radio module, and the sensor modules in the appliances for control detect the running states of the according appliances and some trigger actions, such as if it has been operated, and transmit to the router through a radio module. The said radio module may be a WLAN (Wireless Local Area Networks) module, a RFID (Radio Frequency Identification) module, a Bluetooth module, and else.

In the step S200, the router analyzes a busiest working period and an according working mode of each appliance, based on the information of multiple times of the working modes of each appliance and the according working periods. Specifically, the radio modules installed in the appliance for control transmit to the router the historical usage records on the user's operations to the appliance, and the router will then get to know those multiple working modes information and the according working periods of various appliances. Then, the router will sort out a series of data forms, through the corresponding algorithms, and analyze which usage period has the most usage frequency for each appliance, and what is the most commonly used control mode, etc. By such a continuous study, the said controlling method may approach to a user's usage habits more and more, and, when the router is making an automatic control, the said method will be close to a user's usage habits more and more, and achieves a real intelligent control.

In the step S300, the said router transmits in wireless a control signal to the radio module installed in each appliance, to control the said each corresponding appliance run automatically in the working mode corresponding to the busiest working period. Specifically, in the step S200, the router analyzes the information of a busiest working period and an according working mode of each appliance, based on the information of multiple times of the working modes of each appliance and the according working periods, then control the said each corresponding appliance run automatically in the working mode corresponding to the busiest working period. Because the control signal of each appliance for control has its own coding protocol, the router stated in the present invention solidifies the control instructions for different types of appliances into a flash of each router, and wait until it is required, it may transmit the according control instructions based on the working modes of different types of appliances.

A conventional control system for smart home, can never work without a control from a software client installed in a mobile phone, different clients installed in a mobile phone are required to be open and run for controls, which doesn't match a person's natural usage habits, thus it is not humanized. Furthermore, a traditional smart router owns intelligence only after a human's participation, which can't analyze and utilize a user's actions to an appliance.

While the controlling method for smart home, as provided in the present invention, control the appliances in smart, through a router, which owns several advantages. The controlling method may control the home appliances automatically, based on a user's living habits, and after a certain period's study, it may execute controls automatically without any human's participations, thus it has freed a user's hands, and avoided relying too much on mobile phones, it makes the smart home system not be limited by intelligent phones any more, and makes a user enjoying the smart life.

Figure 2:
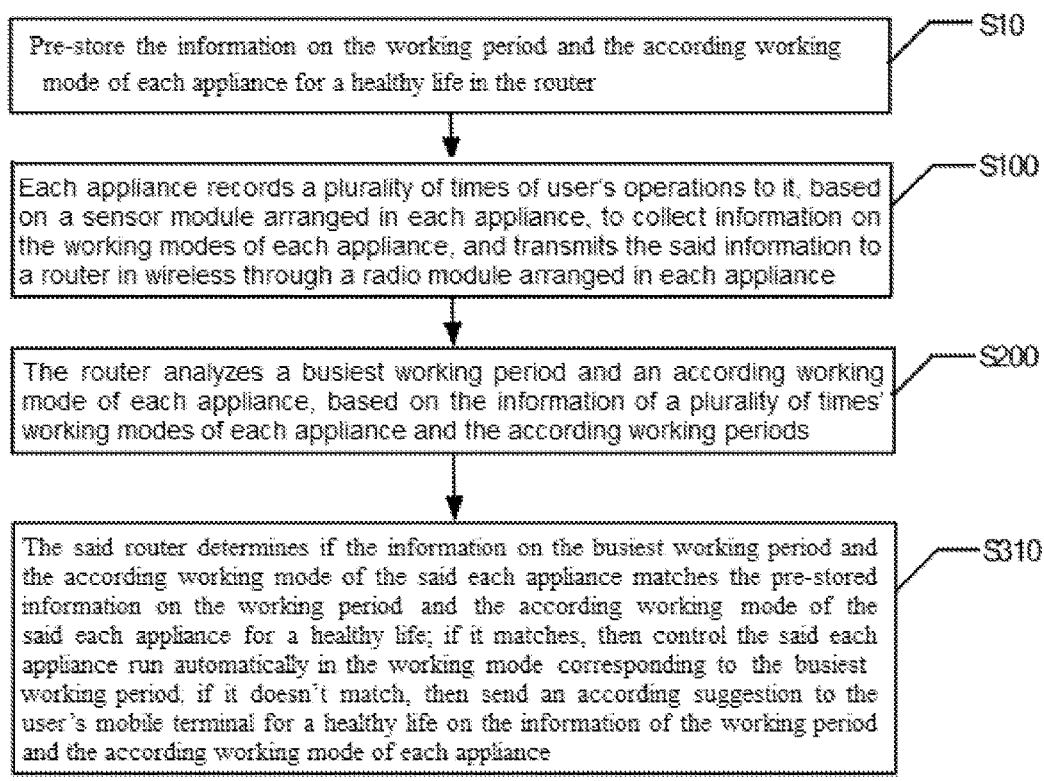
FIG. 2 illustrates a flow chart on the first embodiment of the controlling method for smart home as provided in the present invention.

Referencing to FIG. 2, which is a flow chart on the first embodiment of the controlling method for smart home as provided in the present invention. As shown in the figure, before the operations of further recording in each appliance that the user's multiple times of operations to the said each appliance, collecting accordingly the working modes information of each appliance in multiple times based on a sensor module arranged on each appliance, and transmitting to the router in wireless through the radio module arranged in each appliance, it further includes:

Step S10, pre-store the information on the working period and the according working mode of each appliance for a healthy life in the router. Specifically, it is saved in a NAND Flash memory in the router that the information on the working periods and the according working modes of each appliance for a healthy life.

Furthermore, the said router transmits a control signal to the radio module installed in each appliance, to control the said each appliance run automatically in the working mode corresponding to the busiest working period, specifically, it includes the following steps:

S310, the said router determines if the information on the busiest working periods and the according working modes of the said each appliance matches the pre-stored information for a healthy life on the working periods and the according working modes of the said each appliance. If it matches, then the said each appliance will be controlled run automatically in the working mode corresponding to the busiest working period. If it doesn't match, then a corresponding suggestion will be sent to the user's mobile terminal on the information of the working periods and the according working modes of each appliance for a healthy life.

Specifically, through a long time usages and data accumulations, the usage habits of a user have been acknowledged through a built-in algorithm, the router determines if a user's habit is reasonable or not, i.e., determine if the information on the busiest working periods and the according working modes of the said each appliance matches the pre-stored information for a healthy life on the working periods and the according working modes of the said each appliance. If it matches, then the said each appliance will be controlled run automatically in the working mode corresponding to the busiest working period. If it doesn't match, then an according suggestion will be sent to the user's mobile terminal on the information for a healthy life of the working periods and the according working modes of each appliance, and during later controls, the router will control the appliances follow the fittest living habits little by little, therefore, it may guide a user's life to a healthy one.

Furthermore, the router detects the running states of the appliances for control, if any abnormal situations are found, the user will then be noticed, to avoid a device damage or an accidence happen. Specifically, the router receives the running state information of the appliances sent from the sensor modules, and determines if it is normal or not.

Controlling home appliances in a conventional timing way, may not deal with any sudden cases happening. For example, a user may go home earlier or later due to some accidents, which may cause a control lag, i.e., a manual intervention is needed or a resources waste is caused. Furthermore, the control system in the prior art, can't turn on those devices with heat inertia (such as an AC, a water heater, and else) in advance when a user is almost getting home, according to the information of the user's locations. That is, a user may have to turn on those home appliances, including ACs, after arriving at home, thus he/she can't enjoy a comfortable home in a suitable temperature generated by the AC. Similarly, the same situation happens to an electric water heater and an electric rice cooker. In other words, the existing smart home control system has not considered running the home appliances in advance, therefore, has brought inconveniences to users.

In order to link the intelligent controlling method to the user's locations, further, before recording in each appliance a user's multiple times' operations to the said various appliances, collecting the working modes information of each appliance in multiple times based on a sensor module arranged in each appliance, and transmitting to a router in wireless through a radio module arranged in each appliance, it further includes: linking the mobile terminal and the router in a network, the mobile terminal obtaining the current locations information of the router, and transmitting both the said router locations information and the mobile terminal ID mark to the router for saving.

Specifically, because the router can't obtain its own locations information, when a mobile terminal links to a router. That is, when a mobile terminal and a router are locating in a same network, the mobile terminal will send its own location information to the router through a GPS (Global Positioning System) module installed in it, and the router will save both the ID information of the mobile terminal and the according location information, then treat the ID as the mobile terminal for location detections, and the location information as the absolute position coordinate of the router. The location information is the absolute position information. The ID of a mobile terminal may be expressed in a plurality of forms, such as an MAC (Media Access Control) address, or a nickname defined by the user.

Furthermore, the said router transmits a control signal to the radio module installed in each appliance, to control the said each appliance run automatically in the working mode corresponding to the busiest working period, it further includes: the mobile terminal obtains its current position information on a basis of a preset time period, and sends to the router through internet; and the router determines if the distance between the current positions of the mobile terminal and the router is smaller than a threshold or not, if so, turns on those devices with heat inertia accordingly in all the home appliances.

Specifically, when a mobile terminal leaves the range of a wireless network, it may send its locations information automatically through GPRS (General Packet Radio Service) signals to a cloud server module in the router at set intervals. The cloud server module may compare and calculate in real time the locations information with the absolute position coordinates of the router itself, and, with the calculated data in every set interval. The router may obtain the locations changing situation of the mobile terminal, if the distance of the current location information between the said mobile terminal and the said router is smaller than a preset threshold, the devices with heat inertia will be turned on accordingly in all the home appliances.

The said devices with heat inertia refer to those home appliances need a certain time's running before being able to provide the required services to users, such as ACs, electric water heaters and electric rice cookers. In such a way, the present invention may detect in real time if a user is on his way back home or not, how far away from home he is, and estimate how long will he get home, based on his speeds, and combine with the heat inertia properties of related appliances, the best time to control the appliances turn on may then be determined.

Preferably, in practical embodiments, a plurality of mobile terminals may exist at one home, then these multiple mobile terminals will all send their ID marks to the router for saving. And, the plurality of mobile terminals will all send their current locations information to the router, the router will then determine if the distance of the closest one is smaller than the threshold or not, if smaller, then the home appliances with heat inertia will be turned on.

Preferably, in practical embodiments, it may also adopt another preferred technique protocol, for example, when a user is on his way home, based on the calculated data in every certain time period, the router may obtain the state of locations information changing of the mobile terminal hold by the user, thus a track of the home route will be generated, meanwhile, the router may estimate the time cost of a route. Afterwards, the router may detect in real time the locations information of the mobile terminal, if it is found that the moving track of the mobile terminal matches the way home, the timer will then be triggered, and the router may turn on the devices with heat inertia in advance.

Preferably, if it is the case of a plurality of mobile terminals, and different IDs of different mobile terminals are referring to different home routes, the router may compare in real time the distances between home and the pluralities of mobile terminals, and take the one closest to home as the basis for control.

In practical embodiments, the router may be controlled either in an automatic way, or based on a user's locations information. For a regular living case of a user, the control mode of a router is fixed. After long time's detection for a user's locations information, a database of his own will be developed, thus, after analyzing a user's habits, the router may know about the time when a user gets home.

During the beginning period of a router participating the controlling, if it is impossible to detect a user's locations information, the router will prefer to timing control various appliances on a pre-set time basis, and if the router has learnt enough information on a user's habit, it will correct the pre-set user's time points again and again, according to a statistic timing basis, an optimal control according to the data analyzed will be run by the router. The router may make the best timing control based on this habit, and achieve a result of setting once, benefiting all his life.

The benefit of this controlling method is, it is not required to upload the locations information all the time from a user's mobile phone, a router may make a timing control automatically. Besides, taking account of a user's internet traffic, the user may choose uploading his locations information or not. If it is impossible to detect a user's locations information and the distance, the router will make a control automatically, following the preset timing basis.

Figure 3:
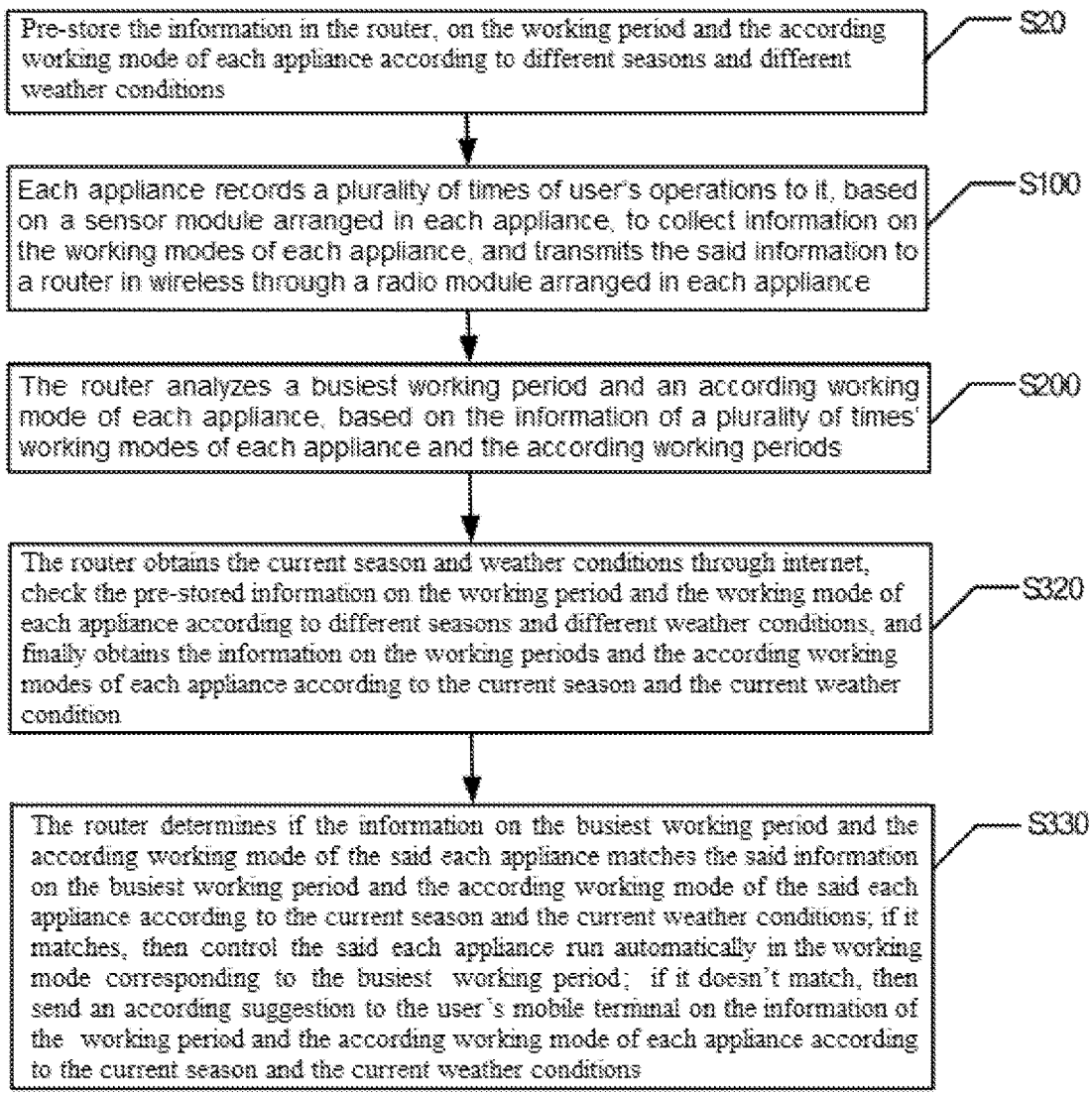
FIG. 3 illustrates a flow chart on the second embodiment of the controlling method for smart home as provided in the present invention.

Referring to FIG. 3, which is a flow chart on the second embodiment of the controlling method for smart home as provided in the present invention. As shown in the figure, further, before the operations of recording in each appliance the user's multiple times of operations to the said each appliance, collecting accordingly the working modes information of each appliance in multiple times based on a sensor module arranged in each appliance, and transmitting to the router in wireless through the radio module arranged in each appliance, it further includes:

S20, pre-store the information in the router, on the working periods and the according working modes of each appliance according to different seasons and different weather conditions.

Specifically, under the conditions of different seasons and different weathers, the working periods and the according working modes of various appliances are different. Therefore, the present invention pre-stores the information in the router, on the working periods and the according working modes of each appliance according to different seasons and different weather conditions.

Further, the router transmits in wireless the control signal to the radio module installed in each appliance, to control accordingly the said various appliances run automatically in the working mode corresponding to the busiest working period, in details, it includes:

S320, the router obtains the current season and weather conditions through internet, check the pre-stored information on the working periods and the working modes of each appliance according to different seasons and different weather conditions, and finally obtains the information on the working periods and the according working modes of each appliance according to the current season and the current weather condition;

S330, the router determines if the information on the busiest working periods and the according working modes of the said each appliance matches the said information on the busiest working periods and the according working modes of the said each appliance according to the current season and the current weather conditions. If it matches, then the said each appliance is controlled run automatically in the working mode corresponding to the busiest working period. If it doesn't match, then an according suggestion will be sent to the user's mobile terminal on the information of the working period and the according working mode of each appliance according to the current season and the current weather conditions.

Specifically, the cloud server module in the router may connect to the internet and obtain the network clock information and the current solar term as well as the current weather condition, therefore, it may search the router for the pre-stored information on the working periods and the working modes of each appliance according to different seasons and different weather conditions, and obtains the information on the working periods and the according working modes of each appliance according to the current season and the current weather condition.

Then the router will make a determination, determines if the information on the busiest working periods and the according working modes of each appliance matches the said information on the busiest working periods and the according working modes of each appliance according to the current season and the current weather condition. If it matches, then the said each appliance will be controlled run automatically in the working mode corresponding to the busiest working period. If it doesn't match, then an according suggestion will be sent to the user's mobile terminal on the information of the working periods and the according working modes of each appliance according to the current season and the current weather conditions.

Such a control mode may be closer to a person's living habits, and make the person more comfortable. In the prior arts, the currently used controlling methods have not integrated with the present controlling methods, and a same controlling method is applied to all different seasons, therefore, the controlling method for smart home described in the present invention is more reasonable.

The controlling method for smart home as provided in the present invention, has freed a user's hands, only the first time settings are needed, with the router's continuously learning of a user's living habits, a state without any manual interceptions will be achieved little by little. At the same time, the router may achieve a purpose of guiding a user's living habit to a healthy one, through the preset controlling method for home appliances for a healthy living, and may make the smart home more intelligent, make the intelligent control to smart home not based on a user's manual operations anymore.

The controlling method as provided in the present invention is different to any conventional controlling methods for smart home, which requires a user to install a plurality of applications without any selections, and different to the current method of intelligent controlling any home appliances achieved through operating mobile phones only, and the present invention owns more intelligence, and a simpler operation, it is more humanized.

The controlling method for smart home provided in the present invention, further makes the automatic control for devices more intelligent and simpler, based on the distance detections between the user and the router, by uploading its locations information into a cloud module in the router through the user's mobile phone. The router may determine if a user is on his way back home, how far away from home he is, and estimate how long will he get home, in order to control the appliances with heat inertia (such as ACs, water heaters and else) more precisely. Compared to the present invention, the conventional controlling method based on a timely controlling is hard to deal with any user's emergency situations, and wasting a lot of resources.

The controlling method for smart home provided in the present invention, further makes an intelligent determination to the current solar term and the current weather condition, based on the network clock information, then according to the pre-stored information of different appliances on different working periods and the corresponding working modes according to different seasons and different weather conditions, controls the corresponding home appliances. Such a controlling method is closer to a person's living habits, and makes a user more comfortable. Compared to the present invention, the existing controlling method doesn't integrate the present controlling methods, and applies the same controlling method to different solar terms, which is unreasonable.

Figure 4:
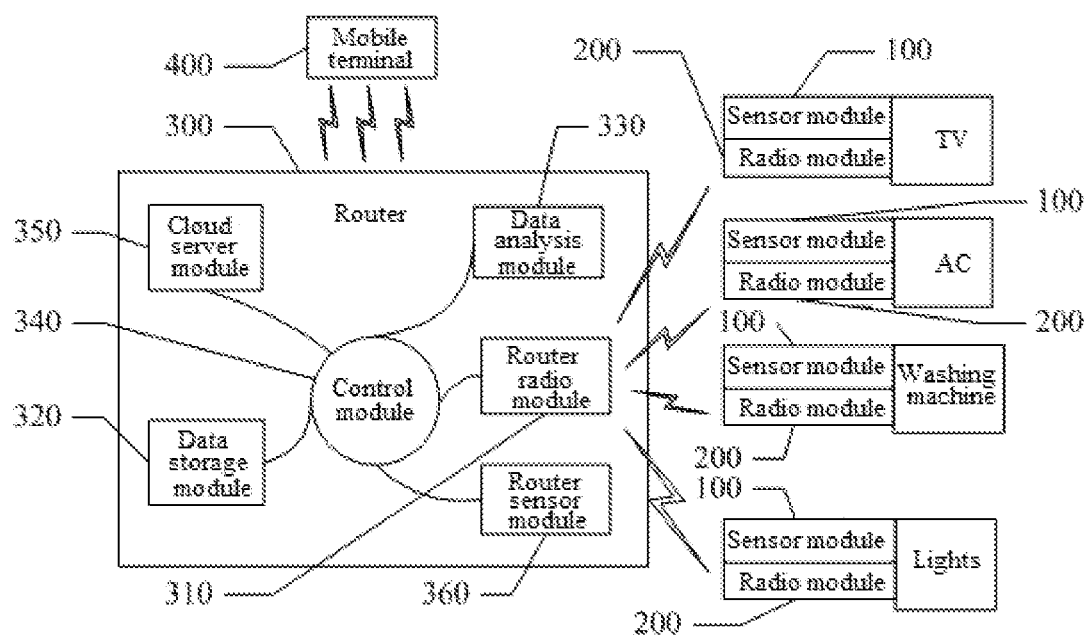
FIG. 4 illustrates a block diagram on the structure of a preferred embodiment of the controlling method for smart home as provided in the present invention.

Based on the above said controlling method for smart home, the present invention further provides a controlling system for smart home, referencing to FIG. 4, which is a block diagram on the structure of a preferred embodiment of the controlling method for smart home as provided in the present invention, shown as FIG. 4, the said controlling system for smart home may comprise a sensor module 100, which may be installed in various home appliances (as the TV, AC, washing machine, lights shown in FIG. 4), applied to detect working states of the corresponding home appliances.

The said controlling system for smart home may further comprise a radio module 200 installed in various home appliances, which may be applied to both transmit in wireless the working state information of the according home appliances and receive in wireless the control signals corresponding to home appliances sent by the wireless router 300.

The said controlling system for smart home may further comprise a router 300. The router 300 may comprise a router radio module 310, a data storage module 320, a data analysis module 330 and a control module 340.

The router radio module 310 may be applied to receive the multiple working modes information of the various appliances collected by the sensor modules 100 installed in the various appliances and sent in wireless by the radio module 200. The data storage module 320 may be applied to save the multiple working modes information and the according working periods of the various appliance.

The data analysis module 330 may be applied to analyze the busiest working periods and the according working modes of various appliance, based on the working modes of each appliance in multiple times and the according working periods. The control module 340 may be applied to transmit in wireless a control signal to the radio modules 200 installed in various appliances, control accordingly the various appliances automatically run in the busiest periods with the corresponding working modes.

In a real embodiment, the said sensor module 100 is used to detect the running state of the home appliances for control and the controlling modes of the user to appliances. The radio module 200 is used to send a user's controlling habits to the router 300, and it is also used to receive the instructions sent by the router 300, used to control the running of the appliances. The said radio module 200 is used to communicate with the peripheral home appliances for control through wireless protocols, and transmit information on the control instructions and the running states.

The said data analysis module 330 is used to calculate and analyze the data saved in the data storage modules, and obtain a user's living habit during a certain time period, applied to be the basis for intelligent controlling home appliances. The data analysis module 330 founds a user's usage habits into a database, through every day's continuous study and renewal, based on the analysis with rich data, a user's behaviors and habits will be acknowledged, and a long time accumulated knowledge basis makes the router own an ability to make a best control to the usage modes, based on the analyzed data. The said control module 340, used to control various modules work together, control the data flow between various modules, control data savings and calculations, control data analysis and obtain a user's living habits, thus achieves the purpose of an intelligent control.

Further, the said data storage module 320 is also used to store the information on working periods and the according working modes for healthy living.

The said control module 340, is further used to determine if the information on the busiest working period and the according working mode of the said each appliance matches the pre-stored information on the working period and the according working mode of the said each appliance for a healthy life. If it matches, then control the said each appliance run automatically in the working mode corresponding to the busiest working period. If it doesn't match, then send an according suggestion to the user's mobile terminal on the information of the working period and the according working mode of each appliance for a healthy life.

The said router 300 further comprises a cloud server module 350, used to receive the current location information obtained by the mobile terminal 400 through the internet in every preset time period. The said data storage module 320 is also used to store the current location information of the router and the ID marks of the mobile terminals, obtained by the mobile terminal 400 when the mobile terminal 400 connects to the router 300 in a network. The said data analysis module 330 is also used to determine if the distance between the current location information of the said mobile terminal 400 and the said router 300 is smaller than a threshold, if it is, then turn on the home appliances with heat inertia in the said various home appliances accordingly. The said data storage module 320 is further used to store the information on the corresponding working periods and the working modes of various home appliances according to different seasons and different weather conditions;

The router 300 comprises the cloud server module 350, which may be applied to obtain the current season and weather conditions through internet, check the pre-stored information on the working periods and the working modes of each appliance according to different seasons and different weather conditions, and finally obtains the information on the working periods and the according working modes of each appliance according to the current season and the current weather condition.

The control module 340 may be further applied to determine if the information on the busiest working period and the according working mode of the said each appliance matches the said information on the busiest working period and the according working mode of the said each appliance according to the current season and the current weather conditions. If it matches, then control the said each appliance run automatically in the working mode corresponding to the busiest working period. If it doesn't match, then send an according suggestion to the user's mobile terminal on the information of the working period and the according working mode of each appliance according to the current season and the current weather conditions.

The said mobile terminal 400 includes a cell phone, a tablet, a PC and more.

The said router 300 further includes a router sensor module 360, used to detect the current environmental conditions, so it may make different control modes pointing to different solar terms.

In a real embodiment, first, the router may load different plug-ins corresponding to different home appliances, the user may arrange different preset control modes. Second, when the appliances for control starts to work, control information during different time periods, may be transmitted to the router 300 through the radio module 200, and the router 300 may record the operation histories of the home appliances and make a statistic table. Following the enrichments of the static database, the router 300 will need no more manual interventions, but automatically control.

The control module 340 acts as a CPU, which is taking care of the control of data flow between various modules, applying the on and off instructions to various modules, and more. The data storage module 320 is used to store various controlling programs and controlling methods for the device. Also, it may store the user's usage data and usage habits sent from the sensor module 100 and the radio module 200 installed in the appliances for control.

Installing a radio module 200 and a sensor module 100 in the appliances for control, wherein, the sensor module 100 may detect the usage situations in a real time of the various home appliances, and study from the user those different control selections under a same or similar situation, or study the control under those specific situations not existing in the preset settings. It may record the control habits of the user controlling the home appliances, and transmits to the router 300 for analysis through the radio module 200, and improve the intelligent control system through continuous studying and updating.

Because it is impossible to make sure going back home every day at the same time point, if following the conventional timely basis, wherever there is a sudden situation, the router will become dull and helpless. For example, if the user happens to go home one hour earlier, the house is still too warm; or, he goes home 3 hours later, comparing to his regular time point, 3 hours' resources waste will be made. And, in these situations, the user has to manually make the control, which is against the original intentions of the intelligent router.

Now the feather of a cloud server module 350 is coming out, which is, in a regular program, when the user is about to go back home from work, the cloud server is turned on, and the user's location information is transmitted to the cloud server module 350 in the router 300. Then the distance between the user and home is continuously calculated, those appliances with heat inertia, such as an AC, will then be turned on at the best appropriate time point. Of course, in a family, there are several different users, so, during the setting operations, it may write the ID according to each mobile phone into the conditions list for determinations in the cloud server module 350, and make the control with a priority according to a user's position closest to home.

Monitoring the distance between a user and home makes the router be able to determine in advance if there are any sudden accidents happen, and ensure all appliances are running right before the user getting home. The distance monitoring function of the cloud server module 350 and the time control function of the router 300 are complementary to each other. By default, it is controlled by the cloud server, and according to a user's habit, the functions of a cloud server may be selected to be open or close by the user.

Based on the considerations of internet traffic, a user may choose to upload his location information or not. If the location and distance information of the user is impossible to capture, then it will be controlled by the default time points that a user presets. The reason of saying the two functions are complementary is, in some cases, a user may choose to close the cellular data connections, or due to other situations, the cloud server can't capture a user's distance information.

All above, the controlling method and system for smart home provided by the present invention, has solved effectively the problems of operating the existing smart home system troublesome and requiring a user's manual operations which causes a high reliability on the mobile terminals, and has brought inconveniences to users. The problems are solved through the method of the various appliances recording the users' plurality of times of operations to them, collecting their plurality of working modes information accordingly through the sensor modules arranged in various appliances, and transmitting to the router in wireless through the radio modules arranged in various appliances.

The said router analyzes the busiest working periods and the according working modes of each appliance, based on the working modes of each appliance in a plurality of times and the according working periods. The said router then transmits the control signal in wireless to the radio modules installed in the said various appliances, controls the said corresponding various appliances run automatically in the working mode corresponding to the busiest working period. The said controlling method and system owns a simple operation, may be controlled automatically without any user's manual operations, it is close to a user's usage habits, and more humanized, it has freed a user's hands, and avoided relying too much on the mobile terminals. Therefore, it has brought a great convenience to users.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A controlling method for smart home comprising:
    obtaining a router position of a router by connecting the router to a mobile terminal and using a global positioning system (GPS) module of the mobile terminal;
    recording, by a home appliance, a plurality of operation information of the home appliance;
    collecting, by the home appliance, the plurality of operation information based on a sensor module arranged in the home appliance;
    transmitting, by the home appliance, the plurality of operation information to the router wirelessly through a radio module arranged in the home appliance;
    analyzing, by the router, the plurality of operation information to obtain a working period and a working mode of the home appliance;
    obtaining a terminal location information of the mobile terminal to obtain a distance between the router and the mobile terminal; and
    transmitting, by the router, a control signal to the radio module of the home appliance to control the home appliance automatically running in the working mode corresponding to the working period when the distance between the router and the mobile terminal is less than a preset threshold.

2. The controlling method for smart home according to claim 1, wherein, before recording, by the home appliance, the plurality of operation information of the home appliance, further comprises:
    pre-storing a default working period and a default working mode of the home appliance in the router.

3. The controlling method for smart home according to claim 2, wherein, transmitting, by the router, a control signal to the radio module of the home appliance to control the home appliance automatically running in the working mode corresponding to the working period, comprises:
    determining, by the router, whether the working period and the working mode of the home appliance match the default working period and the default working mode;
    when the working period and the working mode of the home appliance match the default working period and the default working mode, controlling the home appliance automatically running in the working mode corresponding to the working period;
    when the working period and the working mode of the home appliance do not match the default working period and the default working mode, sending a corresponding suggestion to the mobile terminal.

4. The controlling method for smart home according to claim 1, wherein, before recording, by the home appliance, the plurality of operation information of the home appliance, further comprises:
    pre-storing a default working period and a default working mode of the home appliance running in various seasons and various weather conditions in the router.

5. The controlling method for smart home according to claim 4, wherein transmitting, by the router, the control signal to the radio module of the home appliance to control the home appliance automatically running in the working mode corresponding to the working period, further comprises:
    obtaining a current season and a current weather condition through internet;
    checking the default working period and the default working mode of the home appliance running in various seasons and various weather conditions;
    determining, by the router, whether the working period and the working mode of the home appliance match the default working period and the default working mode under the current season and the current weather condition;
    when the working period and the working mode of the home appliance match the default working period and the default working mode under the current season and the current weather condition, controlling the home appliance automatically running in the working mode corresponding to the working period;
    when the working period and the working mode of the home appliance do not match the default working period and the default working mode under the current season and the current weather condition, sending a suggestion to the mobile terminal.

6. A controlling method for smart home, comprising:
    connecting a mobile terminal and a router into a network;
    obtaining a router position of the router by using a global positioning system (GPS) module of the mobile terminal;
    transmitting the router position of the router and an identity (ID) of the mobile terminal to the router for saving;
    recording, by a home appliance, a plurality of operation information of the home appliance;

collecting, by the home appliance, the plurality of operation information based on a sensor module arranged in the home appliance;

transmitting, by the home appliance, the plurality of operation information to a router wirelessly through a radio module arranged in the home appliance;

analyzing, by the router, the plurality of operation information to obtain a working period and a working mode of the home appliance;

obtaining a terminal location information of the mobile terminal to obtain a distance between the router and the mobile terminal; and transmitting, by the router, a control signal to the radio module of the home appliance to control the home appliance automatically running in the working mode corresponding to the working period when the distance between the router and the mobile terminal is less than a preset threshold.

7. The controlling method for smart home according to claim 6, wherein, transmitting, by the router, a control signal to the radio module of the home appliance to control the home appliance automatically running in the working mode corresponding to the working period, comprises:

obtaining a router position of the mobile terminal on a basis of a preset time period;

sending the router position of the mobile terminal to the router through internet;

determining, by the router, whether the distance between the mobile terminal and the router is smaller than a threshold;

when the distance between the mobile terminal and the router is smaller than the threshold, turning on the home appliance.

8. The controlling method for smart home according to claim 6, wherein, before recording, by the home appliance, the plurality of operation information of the home appliance, further comprises:

pre-storing a default working period and a default working mode of the home appliance in the router.

9. The controlling method for smart home according to claim 8, wherein, transmitting, by the router, a control signal to the radio module of the home appliance to control the home appliance automatically running in the working mode corresponding to the working period, comprises:

determining, by the router, whether the working period and the working mode of the home appliance match the default working period and the default working mode;

when the working period and the working mode of the home appliance match the default working period and the default working mode, controlling the home appliance automatically running in the working mode corresponding to the working period;

when the working period and the working mode of the home appliance do not match the default working period and the default working mode, sending a corresponding suggestion to the mobile terminal.

10. The controlling method for smart home according to claim 6, wherein, before recording, by the home appliance, the plurality of operation information of the home appliance, further comprises:

pre-storing a default working period and a default working mode of the home appliance running in various seasons and various weather conditions in the router.

11. The controlling method for smart home according to claim 10, wherein, transmitting, by the router, the control signal to the radio module of the home appliance to control the home appliance automatically running in the working mode corresponding to the working period, further comprises:

obtaining a current season and a current weather condition through internet;

checking the default working period and the default working mode of the home appliance running in various seasons and various weather conditions;

determining, by the router, whether the working period and the working mode of the home appliance match the default working period and the default working mode under the current season and the current weather condition;

when the working period and the working mode of the home appliance match the default working period and the default working mode under the current season and the current weather condition, controlling the home appliance automatically running in the working mode corresponding to the working period;

when the working period and the working mode of the home appliance do not match the default working period and the default working mode under the current season and the current weather condition, sending a suggestion to the mobile terminal.

12. A controlling system for smart home comprising:

a home appliance;

a router;

a sensor module, arranged in the home appliance to detect a working state of the home appliance; and a radio module, arranged in the home appliance to wirelessly transmit a working state information of the home appliance, and wirelessly receive a control signal sent by the router;

wherein the router comprises:

a router radio module, applied to receive a plurality of operation information of the home appliance collected by the sensor modules installed in the home appliance and wirelessly sent by the radio module;

a data storage module, applied to save the plurality of operation information of the home appliance and store a router position of the router, wherein the router position of the router is obtained by connecting the router to a mobile terminal and using a global positioning system (GPS) module of the mobile terminal;

a data analysis module, applied to analyze the plurality of operation information to obtain a working period and a working mode the home appliance;

a control module, applied to obtain a terminal location information of the mobile terminal to obtain a distance between the router and the mobile terminal, and wirelessly transmit the control signal to the radio module installed in the home appliance, control the home appliance automatically running in the working period with the working mode when the distance between the router and the mobile terminal is less than a preset threshold.

13. The control system for smart home according to claim 12 further comprising:

a cloud server, applied to receive through internet a router position of a mobile terminal in a preset certain period;

wherein the data storage module stores the router position of the router and an identity (ID) of the mobile terminal, obtained by the mobile terminal when the mobile terminal connects with the router in a network;

wherein the data analysis module determines whether a distance between the mobile terminal and the router is less than a threshold;

when the distance between the mobile terminal and the router is smaller than the threshold, turning on the home appliance.

14. The control system for smart home according to claim 12, wherein, the data storage module is further stored a default working period and a default working mode of the home appliance running in various seasons and various weather conditions; the router includes:

a cloud server module, applied to obtain a current season and a current weather condition through internet, check the default working period and the default working mode of the home appliance running in various seasons and various weather conditions;

a control module, further applied to determine whether the working period and the working mode of the home appliance match the default working period and the default working mode under the current season and the current weather condition;

when the working period and the working mode of the home appliance match the default working period and the default working mode under the current season and the current weather condition, controlling the home appliance automatically running in the working mode corresponding to the working period;

when the working period and the working mode of the home appliance do not match the default working period and the default working mode under the current season and the current weather condition, sending a suggestion to a user's mobile terminal.

15. The control system for smart home according to claim 12, wherein, the data storage module stores a default working period and a default working mode of the home appliance;

the control module determines whether the working period and the working mode of the home appliance match the default working period and the default working mode;

when the working period and the working mode of the home appliance match the default working period and the default working mode, controlling the home appliance automatically running in the working mode corresponding to the working period;

when the working period and the working mode of the home appliance do not match the default working period and the default working mode, sending a suggestion to a user's mobile terminal.

* * * * *